(12) United States Patent
Kokubo

(10) Patent No.: US 7,303,241 B2
(45) Date of Patent: Dec. 4, 2007

(54) PUMP DRIVE MOTOR CONTROL APPARATUS

(75) Inventor: Koichi Kokubo, Kariya (JP)

(73) Assignee: Advics Co., Ltd., Kariya, Aichi, Pref. (JP)

( * ) Notice: Subject to any disclaimer, the term of this patent is extended or adjusted under 35 U.S.C. 154(b) by 451 days.

(21) Appl. No.: 10/941,002

(22) Filed: Sep. 15, 2004

(65) Prior Publication Data

US 2005/0069418 A1    Mar. 31, 2005

(30) Foreign Application Priority Data

Sep. 25, 2003    (JP) .............................. 2003-333249

(51) Int. Cl.
*B60T 13/20* (2006.01)
(52) U.S. Cl. ...................... 303/10; 303/116.1
(58) Field of Classification Search .................. 303/10, 303/11, 142, 156, 116.1; 318/3, 9
See application file for complete search history.

(56) References Cited

U.S. PATENT DOCUMENTS

| | | | |
|---|---|---|---|
| 5,704,766 A * | 1/1998 | Fennel et al. ................. | 303/10 |
| 6,056,370 A * | 5/2000 | Okuya et al. ................. | 303/11 |
| 6,339,738 B1 | 1/2002 | Kohl et al. | |
| 6,389,349 B1 * | 5/2002 | Hachtel ....................... | 303/11 |
| 6,499,813 B1 * | 12/2002 | Wandel ....................... | 303/11 |
| 7,021,725 B2 * | 4/2006 | Kokubo ....................... | 303/11 |
| 2006/0202552 A1 * | 9/2006 | Magel et al. ................ | 303/142 |

FOREIGN PATENT DOCUMENTS

| | | |
|---|---|---|
| DE | 196 32 311 A1 | 2/1998 |
| JP | 8-501614 | 2/1996 |
| JP | 2002-506406 A | 2/2002 |
| WO | WO99/55566 | 11/1999 |

OTHER PUBLICATIONS

German Office Action dated Feb. 7, 2006 (with English translation).

* cited by examiner

*Primary Examiner*—Thomas Williams
(74) *Attorney, Agent, or Firm*—Buchanan Ingersoll & Rooney PC

(57) ABSTRACT

A pump drive motor control apparatus controls a motor used for driving a hydraulic pump. Every time the supply of electricity to the motor is resumed (every time the motor control signal changes from a low level to a high level), the apparatus measures a time which the voltage generated by the motor requires to decrease by a predetermined amount, the time indicating the decreasing speed of the generated voltage. The apparatus normally sets the high-level maintenance time, in which the motor control signal is maintained high, to a base time. When a state in which the measured time is not longer than a reference time is detected a predetermined number of times (3 times) or more, the apparatus determines that the load of the pump is heavy. In such a case, the apparatus increases the average rotational speed of the motor by increasing the high-level maintenance time.

9 Claims, 10 Drawing Sheets

PUMP DRIVE MOTOR CONTROL APPARATUS

BACKGROUND OF THE INVENTION

1. Field of the Invention

The present invention relates to a pump drive motor control apparatus for controlling the rotational speed of a motor for driving a pump, and more particularly to a pump drive motor control apparatus which controls the rotational speed of a motor through on-off control performed such that supply of electricity to the motor is resumed on the basis of a result of comparison between a predetermined threshold and a voltage which the motor generates during a period in which supply of electricity to the motor is stopped, and such that the supply of electricity is stopped after the supply of electricity is continued for a predetermined period of time.

2. Description of the Related Art

A conventional pump drive motor control apparatus of such a type is disclosed in, for example, Japanese kohyo (PCT) Patent Publication No. 2002-506406. The disclosed apparatus is applied to a motor for driving a hydraulic pump which pumps brake fluid having discharged to a reservoir as a result of operation of an antilock brake system and supplies the pumped brake fluid to a hydraulic circuit of the antilock brake system. In principle, the apparatus controls the rotational speed of the motor through on-off control performed such that supply of electricity to the motor is resumed when a voltage which the motor generates in accordance with its rotational speed during a period in which supply of electricity to the motor is stopped (i.e., a voltage generated by an induced electromotive force which the motor generates as a result of acting as a generator (hereinafter may be simply referred to as "generated voltage")) becomes equal to or less than a predetermined first threshold, and such that the supply of electricity is stopped after the supply of electricity is continued for a predetermined period of time.

If the reservoir, to which brake fluid is discharged as a result of operation of the antilock brake system, is filled with brake fluid, further discharge of brake fluid from the hydraulic circuit of the antilock brake system to the reservoir becomes impossible, resulting in failure of the antilock brake system to attain brake fluid pressure control (hereinafter, referred to as "ABS control"). Accordingly, by use of the above-mentioned hydraulic pump, brake fluid must be pumped out of the reservoir in order to prevent the brake fluid from filling the reservoir.

The time-average of flow rate at which the hydraulic pump pumps brake fluid out of the reservoir and discharges the brake fluid (hereinafter, may be referred to as "average discharge flow rate" or simply "discharge flow rate") is proportional to the time-average of rotational speed of a motor for driving the hydraulic pump (hereinafter, may be referred to as "average rotational speed" or simply "rotational speed").

Meanwhile, the brake fluid pressure within the hydraulic circuit of the system (accordingly, the discharge pressure or load of the hydraulic pump) serves as a force that lowers the rotational speed of the hydraulic pump (accordingly, the motor). Therefore, the rotational speed of the motor (in particular, the rotational speed during a period in which supply of electricity to the motor is stopped) decreases to a degree that increases with the load imposed on the hydraulic pump.

In other words, as the load imposed on the hydraulic pump increases, the discharge flow rate of the hydraulic pump decreases, thereby making the ABS control easily susceptible to failure. Further, in the case where a large load is imposed on the hydraulic pump, the rotational speed of the motor tends to drop drastically immediately after the resumed supply of electricity to the motor is stopped.

In view of the above, the aforementioned conventional apparatus is designed such that, only during a predetermined short period after the resumed supply of electricity to the motor is stopped, instead of comparing the generated voltage with the first threshold, the apparatus compares the generated voltage with a predetermined second threshold lower than the first threshold, and determines that a large load is imposed on the pump, when the generated voltage is lower than the second threshold. In this case, the conventional apparatus immediately resumes the supply of electricity to the motor, and increases the continuation time during which the supply of electricity is continued. As a result of this operation, the rotational speed (average rotational speed) of the motor having temporarily decreased because of the large load increases, thereby avoiding failure of the ABS control.

However, even in the case where a load is continuously imposed on the hydraulic pump at a level such that the generated voltage does not drop below the second threshold within the predetermined short period after the resumed supply of electricity to the motor is stopped, the quantity of brake fluid stored in the reservoir gradually increases as a result of a continuous decrease in the average rotational speed of the hydraulic pump resulting from the load. As a result, failure of the ABS control may occur. In such a case, the conventional apparatus cannot avoid the failure of the ABS control.

SUMMARY OF THE INVENTION

Accordingly, an object of the present invention is to provide a pump drive motor control apparatus for controlling the rotational speed of a motor for driving a pump, which apparatus can detect in a simple and reliable manner a drop in discharge flow rate of the pump stemming from a load imposed on the pump, and increase the discharge flow rate.

In order to achieve the above object, the present invention provides a pump drive motor control apparatus for controlling a motor for driving a pump, comprising control means for controlling rotational speed of the motor through on-off control performed such that supply of electricity to the motor is resumed on the basis of a result of comparison between a predetermined threshold and a voltage which the motor generates in a state in which supply of electricity to the motor is stopped (i.e., the above-mentioned generated voltage) and such that the supply of electricity is stopped after the supply of electricity is continued for a predetermined period of time; decreasing-speed-index obtaining means for obtaining a voltage-decreasing-speed index value indicative of a rate of decrease of the voltage which the motor generates in the state in which the electricity supply is stopped (the generated voltage); and average-rotational-speed changing means for changing a parameter which affects an average rotational speed of the motor in accordance with a rate of decrease of the voltage represented by the obtained voltage-decreasing-speed index value.

The control means is preferably configured to resume supply of electricity to the motor when the voltage which the motor generates in a state in which supply of electricity to the motor is stopped (i.e., the above-mentioned generated voltage) becomes equal to or less than the threshold.

Examples of the voltage-decreasing-speed index value indicative of the rate of decrease of the voltage include, but are not limited thereto, a time which, after having reached a first voltage greater than the predetermined threshold, the voltage requires to reach a second voltage which is greater than the predetermined threshold but lower than the first voltage. Further, examples of the parameter which affects the average rotational speed of the motor include, but are not limited thereto, the predetermined period of time during which the supply of electricity is continued, and the above-mentioned predetermined threshold.

As described previously, the discharge pressure of (that is, the load imposed on) the pump serves as a force that reduces the rotational speed of the hydraulic pump (accordingly, the motor). Therefore, during a period in which supply of electricity to the motor is stopped and the motor rotates because of inertia, the rotational speed of the motor decreases at a rate that increases with the load imposed on the hydraulic pump. Accordingly, the rate of decrease of the above-mentioned generated speed, which is in proportion to the rotational speed of the motor, also increases with the load imposed on the pump.

The present invention has been accomplished while attention has been paid to such a phenomenon. Specifically, when a pump drive motor control apparatus is configured to change a parameter which affects the average rotational speed of the motor in accordance with a rate of decrease of the generated voltage represented by the above-mentioned voltage-decreasing-speed index value, the pump drive motor control apparatus can increase the average rotational speed of the motor by changing the parameter in accordance with an increase in the rate of decrease of the generated voltage. As a result, the discharge flow rate can be increased, in a simple and reliable manner, in accordance with a decrease in the discharge flow rate of the pump stemming from an increase in the load of the pump. The average rotational speed of the motor can be increased through an operation of increasing the length of the period during which the supply of electricity is continued, the length of the period serving as the above-mentioned parameter, or an operation of increasing the above-mentioned predetermined threshold serving as the above-mentioned parameter.

In this case, the average-rotational-speed changing means may be configured to increase the average rotational speed of the motor by changing the parameter when the rate of decrease of the voltage represented by the obtained voltage-decreasing-speed index value becomes equal to or greater than a predetermined value.

In the pump drive motor control apparatus, preferably, the decreasing-speed-index obtaining means is configured to obtain the voltage-decreasing-speed index value every time the supply of electricity is stopped, and the average-rotational-speed changing means is configured to change the parameter on the basis of a plurality of the voltage-decreasing-speed index values successively obtained by means of the decreasing-speed-index obtaining means. In this case, the average-rotational-speed changing means may be configured to increase the average rotational speed of the motor by changing the parameter when all of voltage decreasing rates represented by the plurality of voltage-decreasing-speed index values successively obtained become equal to or greater than a predetermined value.

In this configuration, since the above-described plurality of values successively obtained are used as the voltage-decreasing-speed index value, on the basis of which pump load is determined, the pump load can be determined more accurately. As a result, the discharge flow rate can be increased, in a more reliable manner, in accordance with a decrease in the discharge flow rate of the pump stemming from an increase in the load imposed on the pump.

In the pump drive motor control apparatus of the present invention, preferably, the pump driven by the motor is a hydraulic pump used in a brake fluid pressure controller of a vehicle including at least an antilock brake system, the hydraulic pump pumping brake fluid discharged to a reservoir as a result of operation of the brake fluid pressure controller and supplying the pumped brake fluid to a hydraulic circuit of the brake fluid pressure controller; and the control means controlling the rotational speed of the motor at least during a period in which the brake fluid pressure controller is operating. Preferably, the control means is configured to start the rotational speed control for the motor simultaneously with the start of operation of the brake fluid pressure controller (start of ABS control).

The configuration reliably prevents the occurrence of failure of the ABS control, which failure would otherwise occur in response to a drop in the discharge flow rate of the hydraulic pump caused by an increase in the load of the pump. Further, when the average-rotational-speed changing means is configured to change the parameter on the basis of a plurality of the voltage-decreasing-speed index values successively obtained by means of the decreasing-speed-index obtaining means, the pump drive motor control apparatus can reliably prevent the previously described "occurrence of failure of the ABS control, which would otherwise occur because of a continuous decrease in the average discharge flow rate of the hydraulic pump caused by a continuous increase in load imposed on the hydraulic pump."

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

First Embodiment

Figure 1:
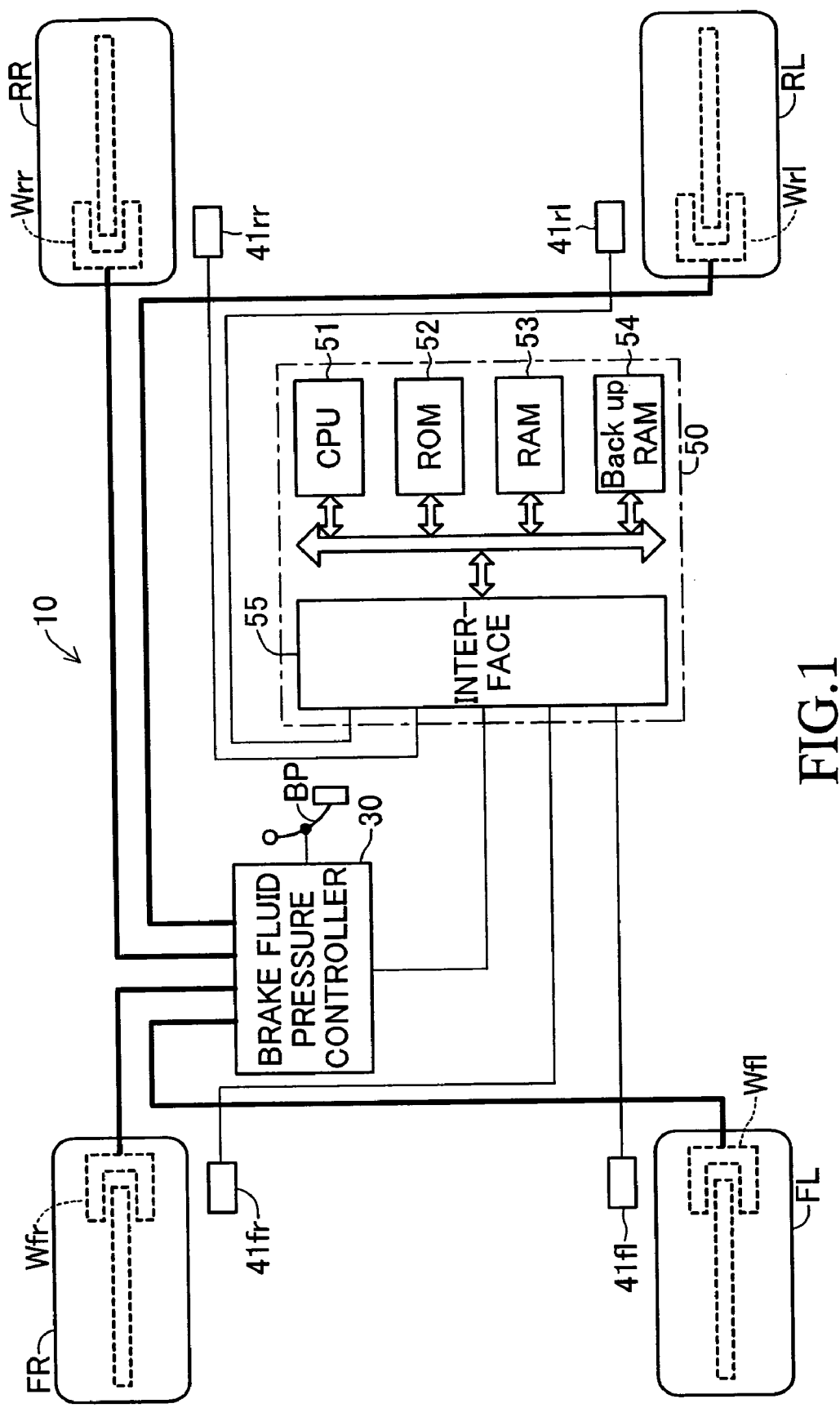
FIG. 1 is a schematic diagram of a vehicle equipped with a vehicle control apparatus including a pump drive motor control apparatus according to a first embodiment of the present invention.

FIG. 1 schematically shows the structure of a vehicle equipped with a vehicle control apparatus 10 including a pump drive motor control apparatus according to a first embodiment of the present invention. The illustrated vehicle is a four-wheel, rear-wheel drive (FR) vehicle having two front wheels (a front left wheel FL and a front right wheel FR) which are non-drive wheels (follower wheels), and two rear wheels (a rear left wheel RL and a rear right wheel RR) which are drive wheels.

This vehicle control apparatus 10 has a brake fluid pressure controller 30 for generating a braking force in each wheel by means of brake fluid pressure.

Figure 2:
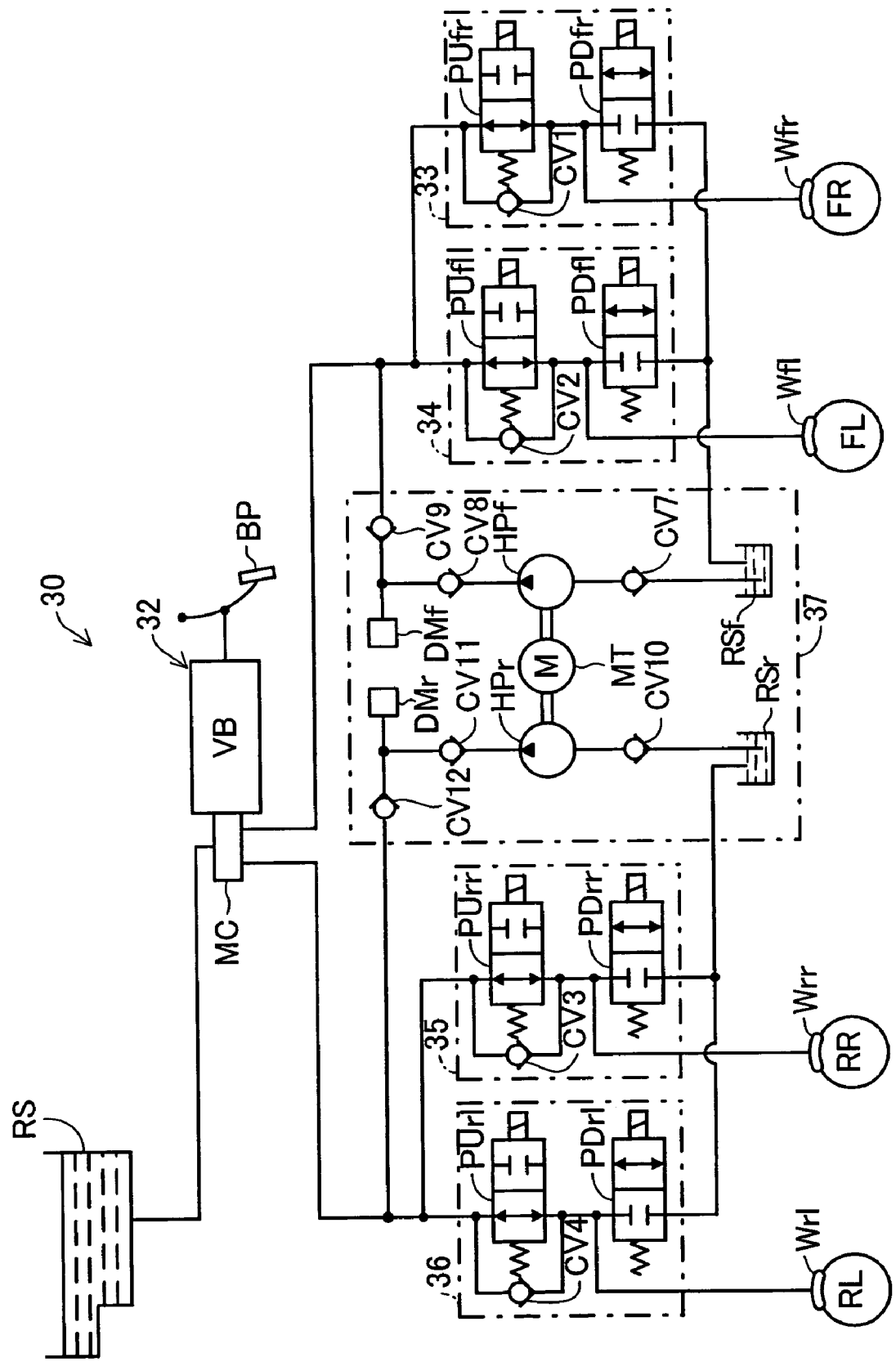
FIG. 2 is a schematic diagram of a brake fluid pressure controller shown in FIG. 1.

As schematically shown in FIG. 2, the brake fluid pressure controller 30 includes a brake fluid pressure generating section 32 which generates brake fluid pressure corresponding to the operating force of a brake pedal BP; an FR brake fluid pressure adjusting section 33, an FL brake fluid pressure adjusting section 34, an RR brake fluid pressure adjusting section 35, and an RL brake fluid pressure adjusting section 36, which can adjust the brake fluid pressures supplied to corresponding wheel cylinders Wfr, Wfl, Wrr, and Wrl respectively installed on the wheels FR, FL, RR, and RL; and a return brake fluid supply section 37.

The brake fluid pressure generating section 32 includes a vacuum booster VB which operates in response to operation of the brake pedal BP, and a master cylinder MC which is linked to the vacuum booster VB. The vacuum booster VB utilizes the pressure (negative pressure) of air within the intake pipe 21a of the engine 21 so as to boost the operating force of the brake pedal BP by a predetermined ratio and transmits the boosted operating force to the master cylinder MC.

The master cylinder MC has two output ports; i.e., a first port and a second port. The master cylinder MC receives brake fluid from a reservoir RS, and generates from the first port a first master cylinder fluid pressure corresponding to the boosted operating force. The master cylinder MC also generates from the second port a second master cylinder fluid pressure which is substantially the same as the first master cylinder fluid pressure and which corresponds to the boosted operating force. The structures and operations of the master cylinder MC and the vacuum booster VB are well known, and therefore an explanation of the details thereof will be omitted. In this manner, the master cylinder MC and the vacuum booster VB generate first and second master cylinder fluid pressures corresponding to the operating force of the brake pedal BP.

The first port of the master cylinder MC is connected to the upstream side of the FR brake fluid pressure adjusting section 33 and the upstream side of the FL brake fluid pressure adjusting section 34. Similarly, the second port of the master cylinder MC is connected to the upstream side of the RR brake fluid pressure adjusting section 35 and the upstream side of the RL brake fluid pressure adjusting section 36. Thus, the first master cylinder fluid pressure is supplied to the upstream side of the FR brake fluid pressure adjusting section 33 and the upstream side of the FL brake fluid pressure adjusting section 34, and the second master cylinder fluid pressure is supplied to the upstream side of the RR brake fluid pressure adjusting section 35 and the upstream side of the RL brake fluid pressure adjusting section 36.

The FR brake fluid pressure adjusting section 33 consists of a pressure increasing valve PUfr, which is a normally-open solenoid valve of a 2-port, 2-position type, and a pressure reducing valve PDfr, which is a normally-closed solenoid valve of a 2-port, 2-position type. When the pressure increasing valve PUfr is in its first position (a position in a nonexcited state) shown in FIG. 2, it establishes communication between the upstream side of the FR brake fluid pressure adjusting section 33 and the wheel cylinder Wfr. When the pressure increasing valve PUfr is in its second position (a position in an excited state), it breaks the communication between the upstream side of the FR brake fluid pressure adjusting section 33 and the wheel cylinder Wfr. When the pressure reducing valve PDfr is in its first position (a position in a nonexcited state) shown in FIG. 2, it breaks communication between the wheel cylinder Wfr and a reservoir RSf. When the pressure reducing valve PDfr is in its second position (a position in an excited state), it establishes the communication between the wheel cylinder Wfr and the reservoir RSf.

With this structure, when the pressure increasing valve PUfr and the pressure reducing valve PDfr are in their first positions, the fluid pressure in the wheel cylinder Wfr is increased upon supply of pressurized brake fluid from the upstream side of the FR brake fluid pressure adjusting section 33 into the wheel cylinder Wfr. When the pressure increasing valve PUfr is in the second position and the pressure reducing valve PDfr is in the first position, regardless of the fluid pressure in the upstream side of the FR brake fluid pressure adjuster 33, the fluid pressure in the wheel cylinder Wfr at the time of changeover is maintained. When the pressure increasing valve PUfr and the pressure reducing valve PDfr are in their second positions, the brake fluid within the wheel cylinder Wfr is allowed to return to the reservoir RSf, whereby the fluid pressure in the wheel cylinder Wfr is decreased.

A check valve CV1 which allows flow of the brake fluid in only one direction from the wheel cylinder side Wfr to the upstream side of the FR brake fluid pressure adjuster 33 is connected in parallel with pressure increasing valve PUfr. As a result, when the brake pedal BP is released after being operated, the brake fluid pressure in the wheel cylinder Wfr is rapidly decreased.

Similarly, the FL brake fluid pressure adjuster 34, the RR brake fluid pressure adjuster 35, and the RL brake fluid pressure adjuster 36 comprise a pressure increasing valve PUfl and a pressure reducing valve PDfl, a pressure increasing valve PUrr and a pressure reducing valve PDrr, and a pressure increasing valve PUrl and a pressure reducing valve PDrl, respectively. By controlling the positions of each pressure increasing valve and pressure reducing valve, the brake fluid pressure in the wheel cylinder Wfl, the wheel cylinder Wrr, and the wheel cylinder Wrl can be increased, maintained, or decreased. Checks valves CV2, CV3, and CV4 are provided in parallel with the pressure increasing valves PUfl, PUrr, and PUrl, respectively, to provide the same function as that of the check valve CV1.

The return brake fluid supply section 37 includes a DC motor MT, and two hydraulic pumps HPf and HPr simultaneously driven by the motor MT. The hydraulic pump HPf pumps via a check valve CV7 the brake fluid returned from the pressure reducing values PDfr and PDfl to the reservoir RSf, and supplies the pumped brake fluid to the upstream sides of the FR brake fluid pressure adjuster 33 and the FL brake fluid pressure adjuster 34 via check valves CV8 and CV9.

Similarly, the hydraulic pump HPr pumps via a check valve CV10 the brake fluid returned from the pressure reducing values PDrr and PDrl to the reservoir RSr, and supplies the pumped brake fluid to the upstream sides of the RR brake fluid pressure adjuster 35 and the RL brake fluid pressure adjuster 36 via check valves CV11 and CV12. Notably, in order to reduce pulsations of discharge pressures of the hydraulic pumps HPf and HPr, dampers DMf and DMr are disposed in a hydraulic circuit between the check valves CV8 and CV9 and a hydraulic circuit between the check valves CV11 and CV12, respectively. The respective discharge flow rates of the hydraulic pumps HPf and HPr are proportional to their rotational speeds.

With the structure described above, when all the solenoid valves are in their first positions, the brake fluid pressure controller 30 supplies to each wheel cylinder a brake fluid pressure corresponding to the operating force of the brake pedal BP. In this state, it become possible to decrease only the brake fluid pressure in, for example, the wheel cylinder Wrr by a predetermined amount through control of the pressure increasing valve PUrr and the pressure reducing valve PDrr. That is, the brake fluid pressure controller 30 can individually decrease the brake fluid pressure in the wheel cylinder of each wheel from the brake fluid pressure corresponding to the operating force of the brake pedal BP.

Referring back to FIG. 1, the vehicle control apparatus 10 includes wheel speed sensors 41fl, 41fr, 41rl, and 41rr (see FIG. 1) which each output a signal having a pulse each time the corresponding wheel rotates by a predetermined angle; and an electronic controller 50.

The electronic controller 50 is a microcomputer which includes a CPU 51; ROM 52 in which are previously stored routines (programs) to be executed by the CPU 51, tables (look-up tables and maps), constants, and the like; RAM 53 in which the CPU 51 temporarily stores data as necessary; backup RAM 54 which store data when the power supply is on and which maintains the stored data when the power supply is cut off; an interface 55 containing A/D converters; and the like. The above components are interconnected via a bus.

The interface 55 is connected to the wheel speed sensors 41 and supplies signals from the wheel speed sensors 41 to the CPU 51, and it outputs drive signals to each of the solenoid valves and the motor MT of the brake fluid pressure controller 30, and a power transistor Tr, which will be described later, in accordance with instructions from the CPU 51.

The brake fluid pressure controller 30 (CPU 51) executes the above-described ABS control, which is the control of properly decreasing the brake fluid pressure for a specific wheel from the brake fluid pressure corresponding to the operating force of the brake pedal BP, when the specific wheel tends to lock while the driver is operating the brake pedal BP. Since the details of the ABS control are well known, a repeated description therefor will be omitted.

Outline of Rotational Speed Control for Motor MT

Next, there will be described the outline of rotational speed control performed by the pump drive motor control apparatus according to the first embodiment of the present invention (hereinafter, may be referred to as the "present apparatus") incorporated in the above-described vehicle control apparatus 10. The present apparatus is applied to the above-described motor MT, and is designed to control the rotational speed of the motor MT by use of the power transistor (switching element) Tr shown in FIG. 3 and incorporated in the electronic controller 50, while the predetermined pump (the hydraulic pumps HPf, HPr) drive-control condition is satisfied.

Figure 3:
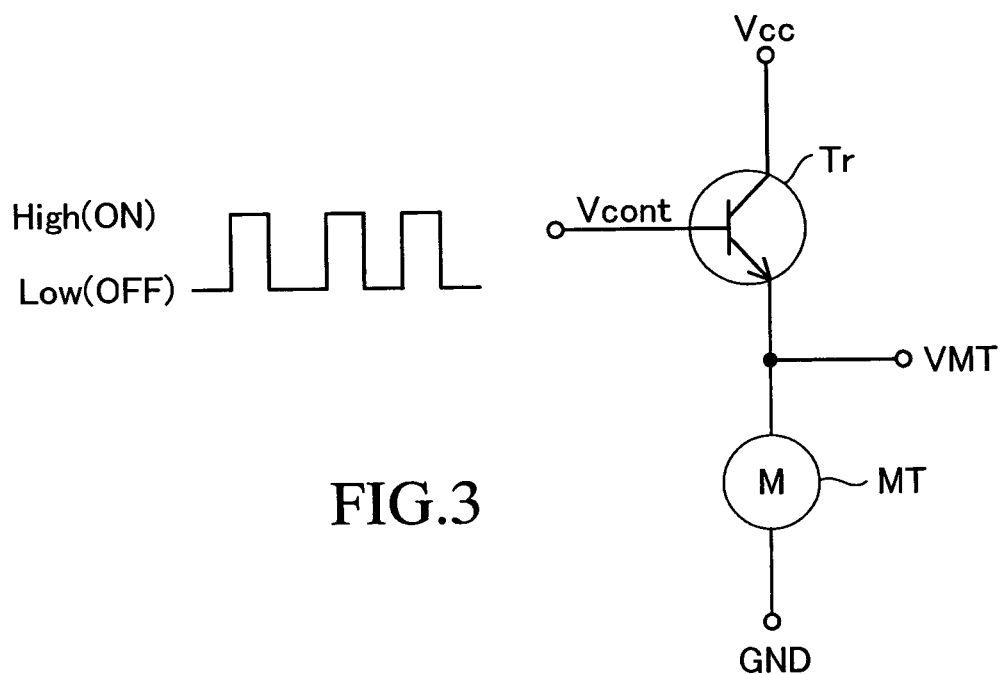
FIG. 3 is a schematic diagram of a drive circuit for driving and controlling a motor MT shown in FIG. 2.

More specifically, as shown in FIG. 3, the collector terminal of the power transistor Tr is connected to the power source (voltage: Vcc (12 V in the present example)) of the vehicle, and the emitter terminal of the power transistor Tr is connected to one terminal of the motor MT. The other terminal of the motor MT is grounded (voltage: GND level). A motor control signal Vcont, which is generated in accordance with an instruction from the present apparatus (CPU 51), is applied to the base terminal of the power transistor Tr.

As shown in FIG. 3, the motor control signal Vcont is generated to assume a High level or a Low level. The power transistor Tr is in an on state when the motor control signal Vcont is at the High level, and is in an off state when the motor control signal Vcont is at the Low level. In other words, when the motor control signal Vcont is at the High level, the voltage Vcc is applied to the motor MT, whereby the motor MT drives the hydraulic pumps HPf and HPr (the supply of electricity to the motor MT is effected), and when the motor control signal Vcont is at the Low level, the voltage Vcc is not applied to the motor MT (the supply of electricity to the motor MT is stopped).

As a result, when the motor control signal Vcont is at the High level, a motor inter-terminal voltage VMT (see FIG. 3), which is a voltage between the two terminals of the motor MT, becomes constant (voltage Vcc). Meanwhile, when the motor control signal Vcont is at the Low level, a voltage generated by the motor MT is output as the motor inter-terminal voltage VMT. The voltage generated by the motor MT is the above-mentioned generated voltage which the motor MT generates, in the form of an induction electromotive force, as a result of acting as a generator. The generated voltage decreases with the rotational speed of the motor MT, which continues rotation because of inertia, and becomes zero when the rotational speed becomes zero.

Figure 4:
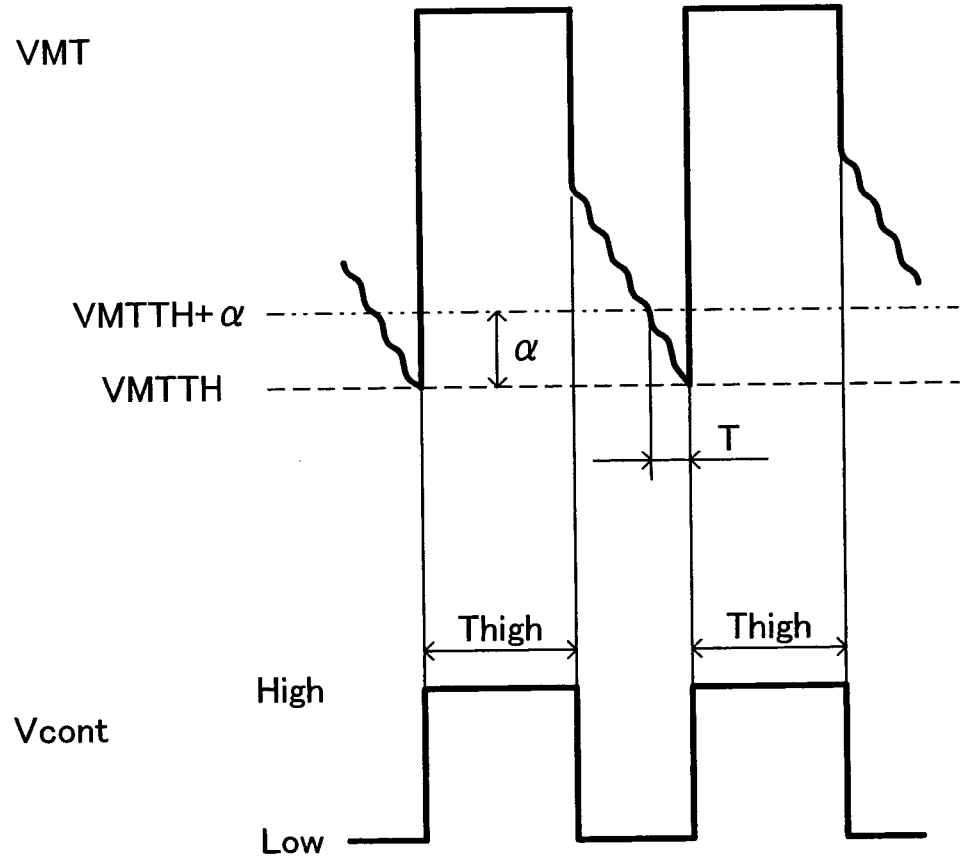
FIG. 4 is a chart showing a method of obtaining a rate of decrease in the generated voltage.

The present apparatus performs the following control. As shown in FIG. 4, when the motor inter-terminal voltage VMT (accordingly, the generated voltage) becomes equal to or less than a voltage threshold VMTTH (a constant value in the present embodiment), which serves as a predetermined threshold, in a state in which the motor control signal Vcont is at the Low level (accordingly, the supply of electricity to the motor MT is stopped), the present apparatus switches the motor control signal Vcont from the Low level to the High level (accordingly, resumes the supply of electricity to the motor MT), and maintains the motor control signal Vcont at the High level for a High-level maintenance time Thigh (which is set in a manner described below) after the switching (accordingly, continues the supply of electricity to the motor MT for the predetermined period of time Thigh after the switching) so as to drive the hydraulic pumps HPf and HPr. Subsequently, the present apparatus switches the motor control signal Vcont from the High level to the Low level (accordingly, stops the supply of electricity to the motor MT) so as to stop the drive of the hydraulic pumps HPf and HPr.

In this state (the motor control signal Vcont is at the Low level), the motor inter-terminal voltage VMT (accordingly, the generated voltage) decreases with the rotational speed of the motor MT, which continues rotation because of inertia. When the motor inter-terminal voltage VMT becomes equal to or less than the voltage threshold VMTTH, the present apparatus again switches the motor control signal Vcont from the Low level to the High level. The present apparatus starts such an operation simultaneously with the start of ABS control (accordingly, the predetermined pump drive-control condition is satisfied simultaneously with the start of ABS control), and so long as the predetermined pump drive-control condition is satisfied, the present apparatus repeats the above-described operation so as to start and stop the supply of electricity to the motor MT, to thereby control the rotational speed of the motor MT. As is understood from the above, the means for controlling the rotational speed of the motor MT corresponds to the control means.

Setting of High-Level-Maintenance Time

As previously described, the rotational speeds of the hydraulic pumps HPf and HPr; in particular, these rotational speeds during a period in which supply of electricity to the motor MT is stopped and the motor MT rotates because of inertia, decrease to a degree that increases with the loads of the hydraulic pumps HPf and HPr (specifically, the brake fluid pressures on the upstream sides of the FR brake fluid pressure adjuster 33 and the FL brake fluid pressure adjuster 34, and the brake fluid pressures on the upstream sides of the RR brake fluid pressure adjuster 35 and the RL brake fluid pressure adjuster 36).

Accordingly, the greater the loads imposed on the hydraulic pumps HPf and HPr and the longer the period over which a heavy load state continues, the greater the degree to which the average discharge flow rates of the hydraulic pumps HPf and HPr decrease, with the result that failure of the ABS control becomes likely to occur in response to the reservoirs RSf and RSr being filled with brake fluid. Therefore, during the ABS control, the loads (specifically, the magnitudes of the loads, times over which the loads are imposed) of the hydraulic pumps HPf and HPr must be monitored, and the average rotational speeds of the motor MT (accordingly, the hydraulic pumps HPf and HPr) must be increased in accordance with drops in the loads.

Since the loads imposed on the hydraulic pumps HPf and HPr serve as forces (torque) that reduce the rotational speeds of the hydraulic pumps HPf and HPr (accordingly, the rotational speed of the motor MT), the rate of decrease in the rotational speed of the motor MT in a state in which supply of electricity to the motor MT is stopped and the motor MT rotates because of inertia increases with the loads imposed on the hydraulic pumps HPf and HPr. In other words, the rate of decrease in the above-mentioned generated voltage VMT, which is proportional to the rotational speed of the motor MT, increases with the loads of the hydraulic pumps HPf and HPr.

Moreover, as shown in FIG. 4, the rate of decrease in the above-mentioned generated voltage VMT can be obtained through measurement of a time T (voltage-decreasing-speed index value) between a point in time at which the generated voltage VMT, which decreases with time, reaches a voltage (first voltage) (VMTTH+α) (which is greater than the voltage threshold VMTTH by a predetermined amount α), and a point in time at which the generated voltage VMT reaches the voltage threshold VMTTH (second voltage). Further, the average rotational speed of the motor MT (accordingly, the average rotational speeds of the hydraulic pumps HPf and HPr) can be increased through an increase in the High-level-maintenance time Thigh.

In view of the foregoing, so long as the predetermined pump drive-control condition is satisfied, the present apparatus measures the above-mentioned time T every time the supply of electricity to the motor MT is resumed. Further, every time the supply of electricity of the motor MT is resumed, the present apparatus usually sets the High-level-maintenance time Thigh to a base time Tbase; and only when a state in which the above-mentioned time T is not longer than a predetermined reference time Tth is continuously detected Nth times (Nth is called the "determination reference number of times" and in the present embodiment is 3) or more, the apparatus determines that the loads imposed on the hydraulic pumps HPf and HPr are large. In such a case, the apparatus adds an additional time Tadd to the base time Tbase, and uses the thus-calculated time (Tbase+Tadd) as the High-level-maintenance time Thigh in a subsequent processing cycle.

In the present embodiment, the additional time Tadd is set in such a manner that the smaller the latest value of the measured time T, the longer the additional time Tadd. This setting is performed on the basis of the knowledge that the shorter the time T (accordingly, the greater the rate of decrease in the generated voltage VMT), the heavier the loads imposed on the hydraulic pumps HPf and HPr, with the result that failure of the ABS control is likely to occur, and that in such a case, the average rotational speed of the motor MT must be increased.

Figure 5:
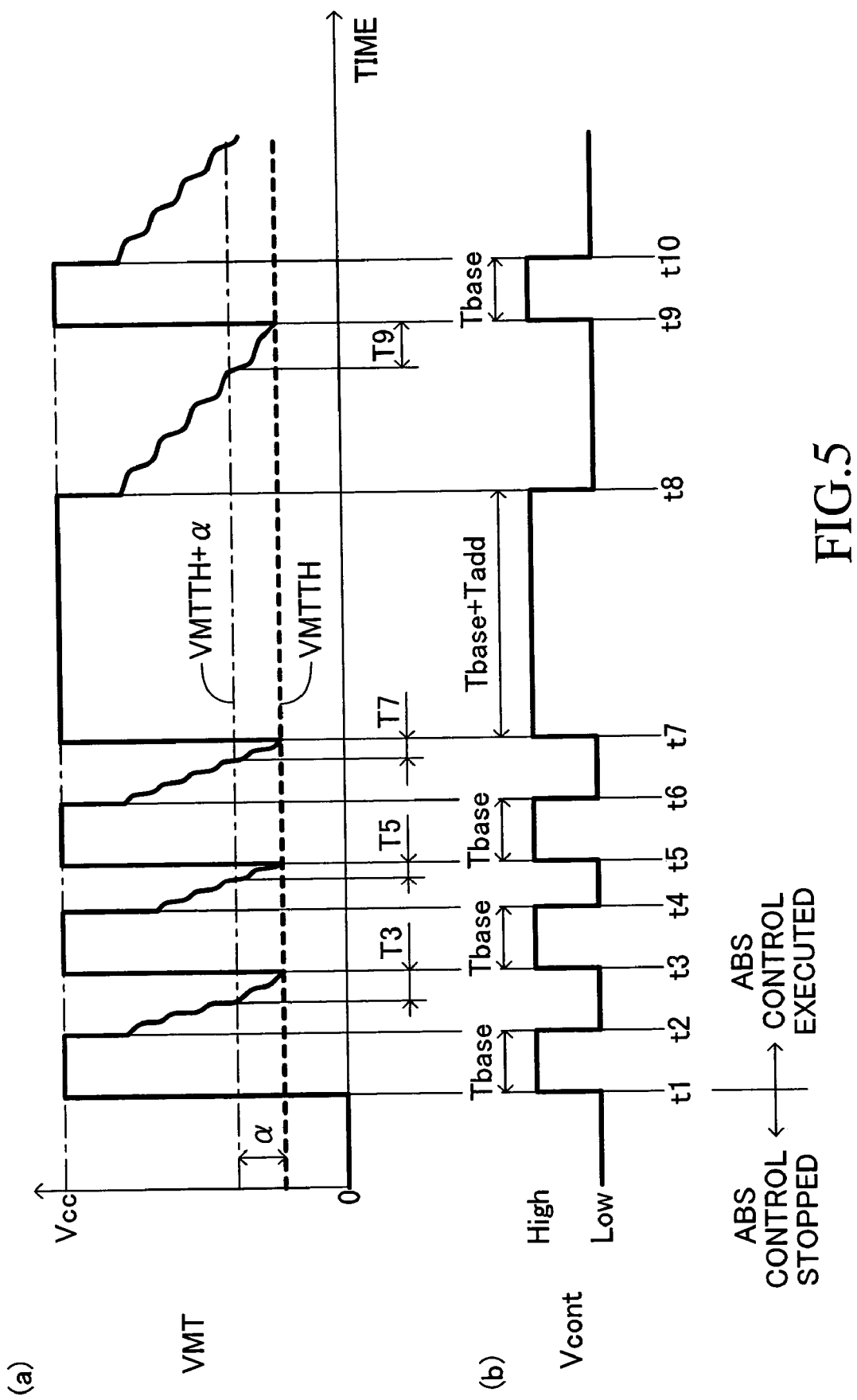
FIG. 5 is a time chart showing example changes in the motor inter-terminal voltage and motor control signal shown in FIG. 3 during execution of ABS control (during drive-control of the motor MT) by the CPU shown in FIG. 1.

FIG. 5 is a time chart showing example changes in the motor inter-terminal voltage VMT and the motor control signal Vcont for the case in which a certain wheel is locked because of the driver's operation of the brake pedal BP, and ABS control is started at time t0 (accordingly, the case in which the predetermined pump drive-control condition is satisfied at and after time t1). This time chart shows an example case in which among times T3, T5, T7, and T9 corresponding to the time T of FIG. 4, the times T3, T5, and T7 are shorter than the above-mentioned reference time Tth, whereas the time T9 is longer than the reference time Tth.

As shown in FIG. 5, before time t1, the motor control signal Vcont is maintained at the Low level (see (b)), and the hydraulic pumps HPf and HPr are stopped, so that the motor inter-terminal voltage VMT is 0 V (see (a)). When time t1 is reached in this state, because the motor inter-terminal voltage VMT is lower than the voltage threshold VMTTH, the present apparatus switches the motor control signal Vcont from the Low level to the High level at time t1, and maintains the motor control signal Vcont at the High level until the High-level maintenance time Thigh of the initial value (a normal value; i.e., the above-mentioned base time Tbase) elapses after time t1 (i.e., from t1 to t2). As a result, during the period from t1 to t2, the motor inter-terminal voltage VMT is maintained at a constant level (Vcc), and the motor MT (accordingly, the hydraulic pumps HPf and HPr) is driven.

At time t2, the present apparatus switches the motor control signal Vcont from the High level to the Low level so as to stop the drive of the motor TM (accordingly, the hydraulic pumps HPf and HPr). As a result, after time t2, due to influence of the braking force (torque) which is imposed on the motor MT in response to brake fluid remaining on the discharge sides of the hydraulic pumps HPf and HPr, and the like, the rotational speed of the motor MT decreases gradually, and the motor inter-terminal voltage VMT (accordingly, the above-described generated voltage VMT) decreases gradually. At time t3, at which the generated voltage VMT becomes equal to or less than the voltage threshold VMTTH, the present apparatus obtains a time T3, which represents the rate of decrease of the generated voltage VMT, and switches the motor control signal Vcont from the Low level to the High level.

The present apparatus repeats the same operation as that performed during the period from t1 to t3 two more times (see the periods of t3 to t5 and t5 to t7). That is, the present apparatus sets the High-level-maintenance time Thigh to the above-mentioned base time Tbase; maintains the motor control voltage Vcont at the High level during the periods from t3 to t4 and from t5 to t6; and at times t5 and t7, at which the generated voltage VMT becomes equal to or less than the voltage threshold VMTTH, the present apparatus obtains times T5 and T7, respectively, each of which represents the rate of decrease of the generated voltage VMT, and switches the motor control signal Vcont from the Low level to the High level.

In this assumed case, since all the times T3, T5, and T7 are not longer than the reference time Tth, the state in which the above-mentioned time T is not longer than the predetermined reference time Tth is continuously detected the determination reference number of times Nth (3 in the present embodiment) or more up to time t7. Therefore, at time t7, the present apparatus determines that the loads imposed on the hydraulic pumps HPf and HPr are large. In such a case, the apparatus adds the additional time Tadd to the base time Tbase, and uses the thus-calculated time (Tbase+Tadd) as the High-level-maintenance time Thigh in a subsequent processing cycle (period from t7 to t8). The additional time Tadd is set in accordance with time T7, which is the latest value of the measured time T. As a result, the High-level-maintenance time Thigh is increased, whereby the average rotational speed of the motor MT is increased.

At time t9, at which the generated voltage VMT becomes equal to or less than the voltage threshold VMTTH, the present apparatus obtains a time T9, which represents the rate of decrease of the generated voltage VMT. In the present assumed case, since the time T9 is longer than the reference time Tth, the present apparatus determines that the hydraulic pumps HPf and HPr have exited the state in which the loads are large, and again sets the High-level-maintenance time Thigh to the base time Tbase (period from t9 to t10).

As described above, the present apparatus normally sets the High-level-maintenance time Thigh to the base time Tbase; and only when all the rates of decrease of the generated voltage VMT represented by a plurality (three in the present embodiment) of times T (see FIG. 4) obtained successively are equal to or greater than a predetermined value, the present apparatus adds the additional time Tadd to the base time Tbase, and uses the thus-calculated time (Tbase+Tadd) as the High-level-maintenance time Thigh in a subsequent processing cycle. The above is the outline of the rotational speed control for the motor MT.

Actual Operation

The actual operation of the vehicle control apparatus 10 including the pump drive motor control apparatus according to the first embodiment of the present invention having the above-described structure will be explained while referring to FIGS. 6 to 9, which show, in the form of flowcharts, routines which are executed by the CPU 51 of the electronic controller 50. Notably, the symbol  attached to the ends of various variables and the like collectively represents the symbols fl, fr, rl, and rr and indicates that the particular variable or the like applies to all of the wheels FR, FL, etc. of the vehicle. For example, the wheel speed Vw collectively indicates the front left wheel speed Vwfl, the front right wheel speed Vwfr, the rear left wheel speed Vwrl, and the rear right wheel speed Vwrr.

Figure 6:
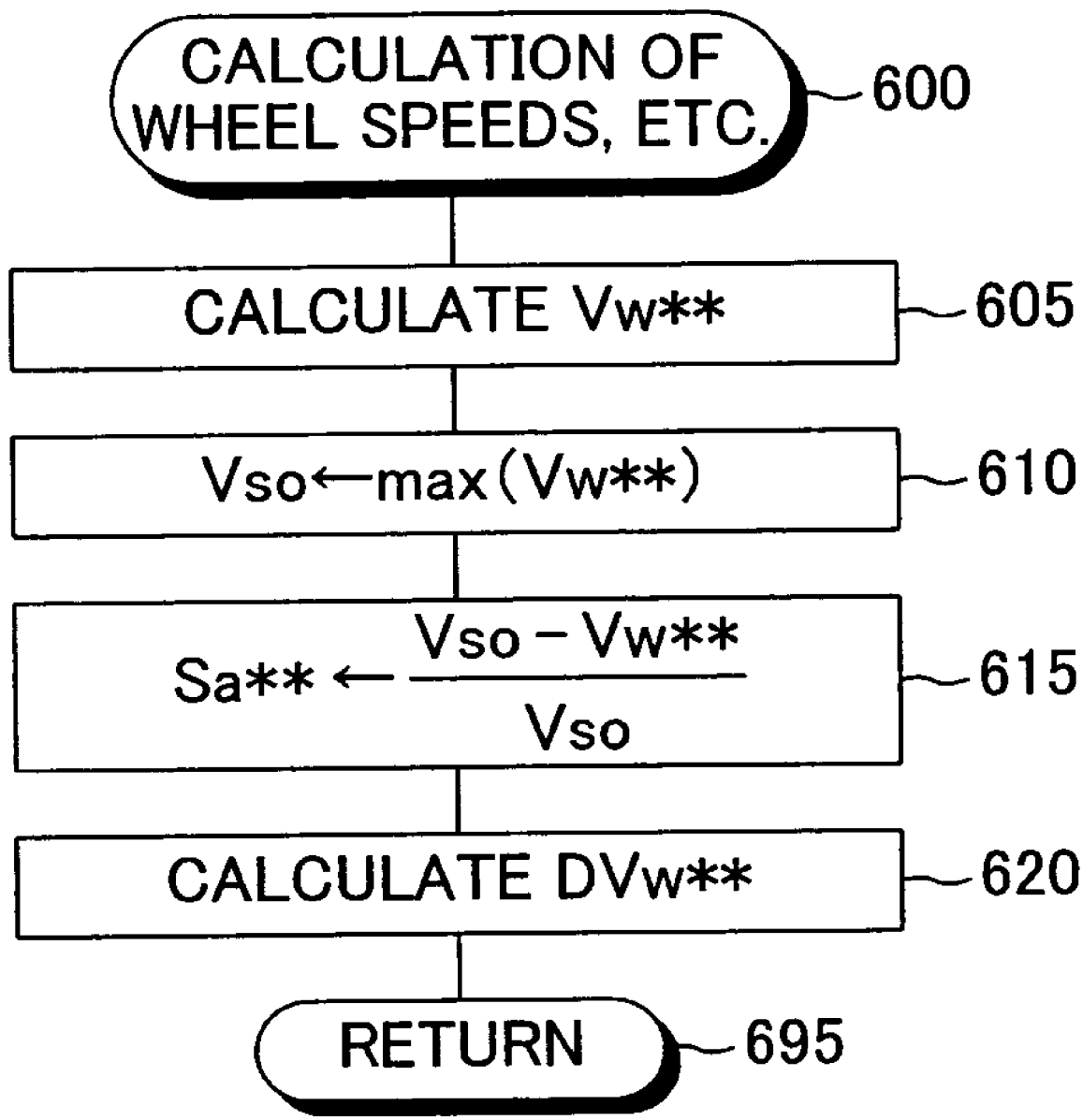
FIG. 6 is a flowchart showing a routine which the CPU shown in FIG. 1 executes in order to calculate wheel speed, etc.
Figure 7:
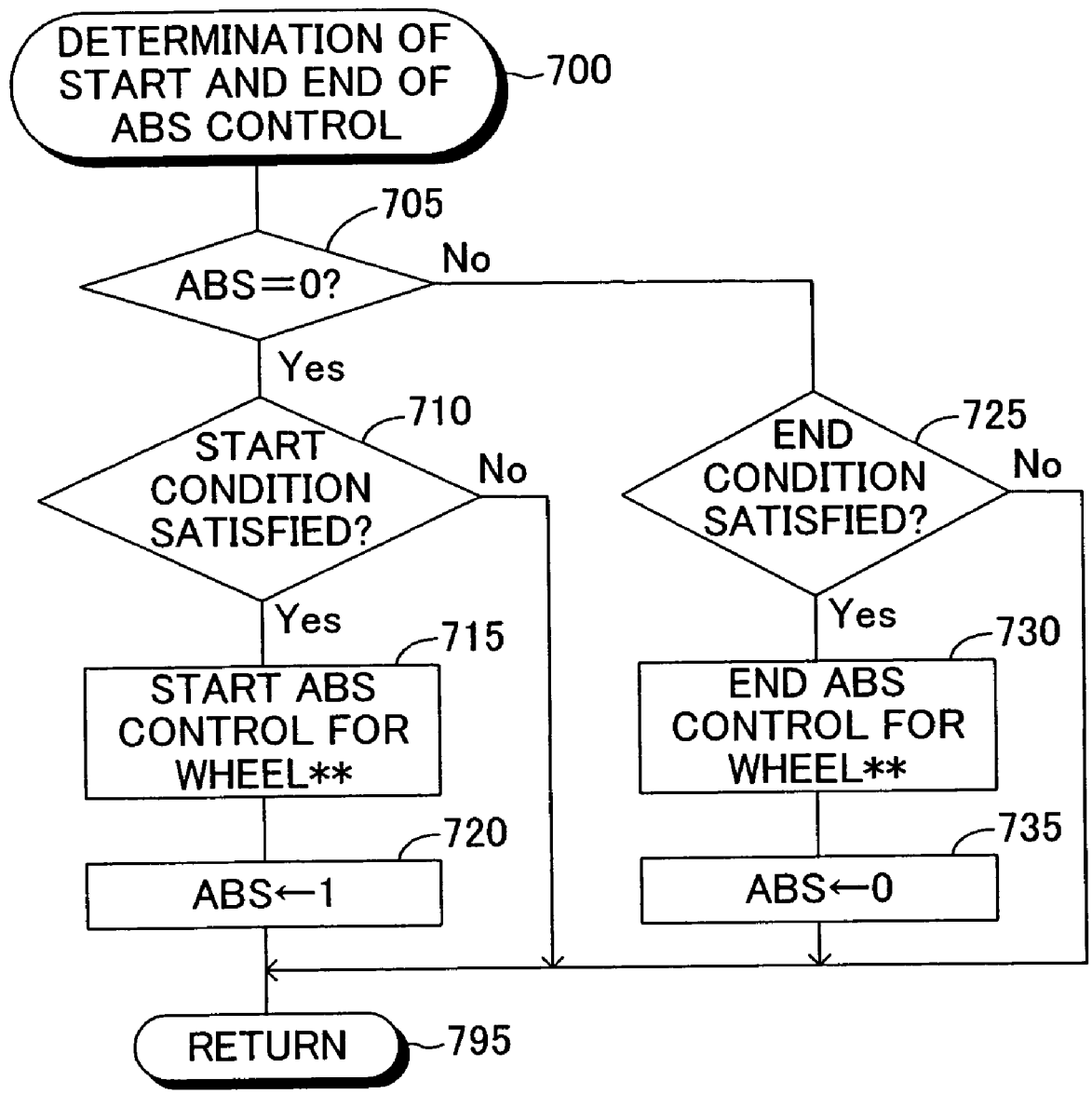
FIG. 7 is a flowchart showing a routine which the CPU shown in FIG. 1 executes in order to make judgment on start and end of ABS control.

At predetermined time intervals, the CPU 51 repeatedly performs a routine shown in FIG. 6 for calculating the wheel speed Vw and other parameters. Accordingly, when a predetermined timing is reached, the CPU 51 starts processing of the routine from Step 600, and proceeds to Step 605 so as to calculate the wheel speed Vw of the wheel (the speed of the outer periphery of the wheel). Specifically, the CPU 51 calculates the wheel speed Vw on the basis of the time intervals between pulses of a signal which each wheel speed sensor 41 outputs.

Next, the CPU 51 proceeds to Step 610 and calculates the largest value among the wheel speeds Vw as the estimated vehicle body speed Vso. Notably, the average of the wheel speeds Vw may be calculated as the estimated vehicle body speed Vso. Subsequently, the CPU 51 proceeds to Step 615 and calculates the actual slip rate Sa of the wheel on the basis of the value of the estimated vehicle body speed Vso calculated in Step 610, the value of the wheel speed Vw** calculated in Step 605, and the equation shown in Step 615.

Subsequently, the CPU 51 proceeds to Step 620 and calculates the wheel acceleration DVw of the wheel, which is a time-differentiated value of the wheel speed Vw**, in accordance with the following Eq. 1. Subsequently, the CPU 51 proceeds to Step 695 so as to end the current execution of the present routine. After that, the CPU 51 repeatedly executes the present routine.

$$DVw^{}=(Vw^{}-Vw1^{**})/\Delta t \qquad \text{Eq. 1}$$

In Eq. 1, Vw1 represents the wheel speed Vw calculated in Step 605 during the previous execution of the present routine, and Δt represents the length of the above-described, predetermined intervals (the computation cycles of the CPU 51).

Next, operation for determining start and end of ABS control will be described. The CPU 51 repeatedly performs a routine shown in FIG. 7 at predetermined time intervals. Accordingly, when a predetermined timing is reached, the CPU 51 starts processing of the routine from Step 700, and proceeds to Step 705 so as to determine whether the value of an ABS control execution flag ABS is "0." When the value is "1," the ABS control execution flag ABS indicates that the above-described ABS control is currently performed. When the value is "0," the ABS control execution flag ABS indicates that the above-described ABS control is currently halted.

The description will be continued on the assumption that the ABS control is currently halted, and ABS control start condition, which will be described later, has not been satisfied. In this case, since the value of the ABS control execution flag ABS has been set to "0," the CPU 51 makes a "Yes" determination in Step 705, and then proceeds to Step 710 in order to determine whether the ABS control start condition is satisfied. The ABS control start condition is satisfied when, for example, the absolute value of the latest wheel acceleration DVw of a specific wheel (at least one wheel) calculated in the previous Step 620 (wheel deceleration |DVw|) is greater than a predetermined deceleration reference value DVwref (positive value), and the latest actual slip rate Sa of the specific wheel calculated in the previous Step 615 is greater than a predetermined slip rate reference value Sref (positive value).

At the present stage, the ABS control start condition is not satisfied as described above. Therefore, the CPU 51 makes a "No" determination in Step 710, and immediately proceeds to Step 795 in order to end the current execution of the present routine. After that, until the ABS control start condition is satisfied, the CPU 51 repeatedly executes the processing in Steps 700 to 710 and Step 795 at the predetermined intervals.

Next, the description will be continued on the assumption that the ABS control start condition is satisfied in this state. In this case, the CPU 51 makes a "Yes" determination when it proceeds to Step 710, and then proceeds to Step 715 in order to start ABS control for a wheel** corresponding to the specific wheel. In Step 720 subsequent to Step 715, the CPU 51 sets the value of the ABS control execution flag ABS to "1." After that, the CPU 51 proceeds to Step 795 so as to end the current execution of the present routine.

Since the ABS control execution flag ABS has been set to "1" as a result of the processing in Step 720, the CPU 51 makes a "No" determination when it proceeds to Step 705, and then proceeds to Step 725 in order to determine whether a predetermined ABS control end condition is satisfied. Since the present stage is immediately after the ABS control has been started, the ABS control end condition is not satisfied. Therefore, the CPU 51 makes a "No" determination in Step 725, and immediately proceeds to Step 795 in order to end the current execution of the present routine.

After that, until the ABS control end condition is satisfied, the CPU 51 repeatedly executes the processing in Steps 700, 705, 725, and 795 at the predetermined intervals. In other words, the value of the ABS control execution flag ABS is maintained at "1" during execution of the ABS control.

Next, the description will be continued on the assumption that the ABS control end condition is satisfied in this state. In this case, the CPU 51 makes a "Yes" determination when it proceeds to Step 725, and then proceeds to Step 730 in order to stop the ABS control performed for all the wheels**. In Step 735 subsequent to Step 730, the CPU 51 sets the value of the ABS control execution flag ABS to "0." After that, the CPU 51 proceeds to Step 795 so as to end the current execution of the present routine.

Since the ABS control execution flag ABS has been set to "0" as a result of the processing in Step 735, the CPU 51 makes a "Yes" determination when it proceeds to Step 705, and then proceeds to Step 710 in order to again perform monitoring for determining whether the ABS control start condition is satisfied. Until the ABS control start condition is again satisfied, the CPU 51 repeatedly executes the processing in Steps 700 to 710 and 795. In other words, the value of the ABS control execution flag ABS is maintained at "0" while the ABS control is stopped.

Next, operation for generating the motor control signal Vcont will be described. The CPU 51 repeatedly performs a routine shown in FIG. 8 at predetermined time intervals. Accordingly, when a predetermined timing is reached, the CPU 51 starts processing of the routine from Step 800, and proceeds to Step 805 so as to determine whether the pump drive-control condition is satisfied.

The pump drive-control condition is satisfied, for example, over a period between a point in time at which the ABS control is started and a point in time at which a predetermined period of time has elapsed after the end of the ABS control. In other words, the pump drive-control condition is satisfied over a period between a point in time at which the value of the ABS control execution flag ABS changes from "0" to "1" and a point in time at which the predetermined period of time has elapsed after the value of the ABS control execution flag ABS changes from "1" to "0."

Here, the description will be continued on the assumption that the pump drive-control condition is satisfied, the motor control signal Vcont is at the Low level, and the motor inter-terminal voltage VMT is not greater than the voltage threshold VMTTH (constant value) (see, for example, time t1 in FIG. 5). The CPU 51 makes a "Yes" determination in Step 805, and proceeds to Step 810 so as to determine whether the value of a high level flag HIGH is "0." When the value is "1," the high level flag HIGH indicates that the motor control signal Vcont is set to the High level. When the value is "0," the high level flag HIGH indicates that the motor control signal Vcont is set to the Low level.

At the present stage, the motor control signal Vcont is at the Low level. Therefore, the CPU 51 makes a "Yes" determination in Step 810, and proceeds to Step 815 so as to determine whether the motor inter-terminal voltage VMT is not greater than the voltage threshold VMTTH. Since the motor inter-terminal voltage VMT is smaller than the voltage threshold VMTTH, the CPU 51 makes a "Yes" determination in Step 815, and proceeds to Step 820. The CPU 51 sets the value of the high level flag HIGH to "1" in Step 820, and clears or sets a counter value Nhigh to "0" in Step 825 subsequent to Step 820. The counter value Nhigh represents a time elapsed after the value of the high level flag HIGH has changed from "0" to "1" (i.e., after the motor control signal Vcont has changed from the Low level to the High level).

Subsequently, the CPU 51 proceeds to Step 830 so as to determine whether the value of the high level flag HIGH is "1." At the present stage, the value of the high level flag HIGH has been set to "1" by means of the processing in the previous Step 820. Accordingly, the CPU 51 makes a "Yes" determination in Step 830, and proceeds to Step 835 so as to set the motor control signal Vcont to the High level and supply it to the base terminal of the power transistor Tr (see FIG. 3). Thus, the drive of the motor MT (accordingly, the hydraulic pumps HPf and HPr) is started.

After that, the value of the high level flag HIGH is maintained at "1." Therefore, so long as the pump drive-control condition is satisfied, the CPU 51 makes a "Yes" determination in Step 805 and then a "No" determination in Step 810, and then proceeds to Step 840, in which the CPU 51 increments the counter value Nhigh ("0" at the present stage) by "1."

Subsequently, the CPU 51 proceeds to Step 845 in order to determine whether the counter value Nhigh is not less than the latest High-level maintaining reference value Nhighref, which correspond to the previously described High-level maintenance time Thigh and is set in a routine to be described later, (accordingly, whether the High-level maintenance time Thigh has elapsed after the point in time at which the motor control signal Vcont changes from the Low level to the High level).

Since the present stage is immediately after the motor control signal Vcont has changed from the Low level to the High level, the CPU 51 makes a "No" determination in Step 845, and immediately proceeds to Step 830. Since the value of the high level flag HIGH is maintained at "1," the CPU 51 makes a "Yes" determination in Step 830, and again performs the processing in Step 835. After that, until the counter value Nhigh reaches the High-level maintaining reference value Nhighref upon repeated execution of the processing in Step 840 (accordingly, until the High-level maintenance time Thigh elapses), the CPU 51 repeatedly executes the processing in Steps 800 to 810, 840, 845, 830, and 835 at the predetermined intervals. Thus, the supply of the motor control signal Vcont of the High level to the power transistor Tr is continued (see, for example, a period between t1 to t2 in FIG. 5), so that the drive of the motor MT (accordingly, the hydraulic pumps HPf and HPr) is continued.

Here, the predetermined period of time Thigh is assumed to have elapsed in this state (see, for example, time t2 in FIG. 5). In this case, the CPU 51 makes a "Yes" determination when it proceeds to Step 845, and proceeds to Step 850. After setting the value of the high level flag HIGH to "0" in Step 850, the CPU 51 proceeds to Step 830.

As a result, the CPU 51 makes a "No" determination in Step 830, and proceeds to Step 855 so as to set the motor control signal Vcont to the Low level and supply it to the base terminal of the power transistor Tr. Thus, the drive of the motor MT (and accordingly the drive of the hydraulic pumps HPf and HPr) is stopped. After that, since the value of the high level flag HIGH is maintained at "0," so long as the pump drive-control condition is satisfied, the CPU 51 makes a "Yes" determination in Steps 805 and 810, and then proceeds to Step 815 in order to again perform monitoring for determining whether the motor inter-terminal voltage VMT is not greater than the voltage threshold VMTTH.

When the rotational speed of the motor MT decreases with elapse of time and the motor inter-terminal voltage VMT becomes equal to or less than the voltage threshold VMTTH (see, for example, time t3 in FIG. 5), the CPU 51 again makes a "Yes" determination at Step 815, and executes the processing in Steps 820 to 835 in order to again supply the motor control signal Vcont of the High level to the base terminal of the power transistor Tr. As a result, the drive of the motor MT (and accordingly, drive of the hydraulic pumps HPf and HPr) is started.

The CPU 51 repeatedly performs the above-described processing at the predetermined intervals. When satisfying the pump drive-control condition becomes impossible (for example, when the predetermined period of time elapses after the ABS control is ended), the CPU 51 makes a "No" determination when it proceeds to Step 805, and then proceeds to Step 860. The CPU 51 sets the value of the high level flag HIGH to "0" in Step 860, and performs the processing in Steps 830 and 855 to thereby supply the motor control signal Vcont of the Low level to the base terminal of the power transistor Tr.

After that, until the pump drive-control conditions is again satisfied (e.g., until the ABS control is again started), the CPU 51 repeatedly executes the processing in Steps 800, 805, 860, 830, and 855. As a result, the motor control signal Vcont is maintained at the Low level, and the drive of the motor MT (and accordingly, the drive of the hydraulic pumps HPf and HPr) is stopped continuously.

Next, operation for setting the High-level-maintenance time Thigh (specifically, the High-level-maintenance reference value Nhighref used in step 845 of FIG. 8) will be described. The CPU 51 repeatedly performs a routine shown in FIG. 9 at predetermined time intervals. Accordingly, when a predetermined timing is reached, the CPU 51 starts processing of the routine from Step 900, and proceeds to Step 905 so as to determine whether the above-described pump drive-control condition is satisfied (excluding satisfaction immediately after establishment of the control condition (see, for example, time t1 in FIG. 5)). When the CPU 51 makes a "No" determination, the CPU 51 proceeds to Step 910 so as to clear a counter value Ngrad to zero, and then proceeds to Step 915 so as to set the High-level-maintenance reference value Nhighref to a base value Nbase corresponding to the above-mentioned base time Tbase. Subsequently, the CPU 51 proceeds to Step 995 so as to end the current execution of the present routine. The counter value Ngrad represents the number of times the condition that the above-mentioned time T (see FIG. 4) is not longer than the reference time Tth is satisfied continuously.

The description will be continued on the assumption that the pump drive-control condition is satisfied, and the present point in time is immediately after the value of the high level flag HIGH has been changed from "1" to "0" (see, for example, time t2, t4, etc., in FIG. 5). In this case, the CPU 51 makes a "Yes" determination when it proceeds to Step 905, and then proceeds to Step 920 so as to determine whether the value of high level flag HIGH is "0." When the CPU 51 makes a "Yes" determination in Step 920, the CPU 51 proceeds to Step 925 so as to determine whether the value of the high level flag HIGH has been changed from "1" to "0."

Since the present point in time is immediately after the time at which the value of the high level flag HIGH has been changed from "1" to "0," the CPU 51 makes a "Yes" determination in each of Steps 920 and 925, and then proceeds to Step 930 so as to clear a counter value G to "0." This counter value G is the value of a counter for measuring the above-mentioned time T (see FIG. 4).

Subsequently, the CPU 51 proceeds to Step 935 so as to determine whether the motor inter-terminal voltage VMT (i.e., generated voltage) is smaller than a value (VMTTH+α) obtained through addition of the above-mentioned predetermined value α to the voltage threshold VMTTH. Since the present point in time is immediately after the motor control signal Vcont has been switched from the High level to the Low level, the generated voltage VMT is greater than the value (VMTTH+α). Accordingly, the CPU 51 makes a "No" determination in Step 935, and immediately proceeds to Step 995 so as to end the current execution of the present routine.

After that, the CPU 51 repeatedly executes the processing in Steps 900, 905, 920, 925, 935, and 995 until the generated voltage VMT, which decreases with time, becomes smaller than the value (VMTTH+α). When the generated voltage VMT becomes smaller than the value (VMTTH+α), the CPU 51 makes a "Yes" determination when it proceeds to Step 935, and then proceeds to Step 940. After incrementing the counter value G ("0" at the present point in time) in Step 940, the CPU 51 proceeds to Step 995 so as to end the current execution of the present routine.

After that, the CPU 51 repeatedly executes the processing in Steps 900, 905, 920, 925, 935, 940, and 995 so long as the value of the high level flag HIGH is maintained at "0" (accordingly, until the generated voltage VMT reaches the voltage threshold VMTTH). As a result, with elapse of time, the counter value G is increased in increments of "1" through repeated execution of Step 940.

When the value of the high level flag HIGH is changed from "0" to "1" (accordingly, the generated voltage VMT reaches the voltage threshold VMTTH (see, for example, time t3, t5, etc., in FIG. 5)), the CPU 51 makes a "No" determination when it proceeds to Step 920, and proceeds to Step 945. After making a "Yes" determination in Step 945, the CPU 51 proceeds to Step 950 so as to determine whether the counter value G, which assumes a value representing the above-mentioned time T (see FIG. 4) at the present point in time, is not greater than the reference value Gth corresponding to the above-mentioned reference time Tth (accordingly, whether the time T is not greater than the reference time Tth).

When the CPU 51 makes a "No" determination in Step 950, the CPU 51 performs the processing of the above-mentioned Steps 910 and 915. Thus, the counter value Ngrad is cleared to zero. Further, the High-level-maintenance reference value Nhighref, which is used for determination in Step 845 of FIG. 8, is set to the base value Nbase corresponding to the above-mentioned base time Tbase. AS a result, upon execution of the routine of FIG. 8, the High-level-maintenance time Thigh is set to the base time Tbase (see, for example, time t9 in FIG. 5).

Meanwhile, when the CPU 51 makes a "Yes" determination in Step 950, the CPU 51 proceeds to Step 955 so as to increment the counter value Ngrad, and then proceeds to Step 960 so as to determine whether the counter value Ngrad is not less than the determination reference number of times Nth (whether the condition that the above-mentioned time T (see FIG. 4) is not longer than the reference time Tth is continuously detected Nth times or more).

When the CPU 51 makes a "No" determination in Step 960 (that is, in the case where, although the condition that the measured time T is not longer than the reference time Tth is satisfied in the present processing cycle, the number of times satisfaction of that condition has been continuously detected is less than the determination reference number of times Nth), while maintaining the present counter value Ngrad, the CPU 51 proceeds to Step 915 so as to set the High-level-maintenance reference value Nhighref to the base value Nbase. As a result, as in the case where a "No" determination is made in Step 950, upon execution of the routine of FIG. 8, the High-level-maintenance time Thigh is set to the base time Tbase (see, for example, times t3, t5, etc., in FIG. 5).

Meanwhile, when the CPU 51 makes a "Yes" determination in Step 960; that is, in the case where the condition that the measured time T (see FIG. 4) is not longer than the reference time Tth has been continuously detected the determination reference number of times Nth or more, the CPU 51 proceeds to Step 965 so as to determine an addition value Nadd corresponding to the above-mentioned addition time Tadd on the basis of the counter value G at the present time and a table described in the box of Step 965. Thus, the addition value Nadd is set such that the shorter the time T, the greater the addition value Nadd (accordingly, the greater the addition time Tadd).

Subsequently, the CPU 51 proceeds to Step 970 so as to store, as the High-level-maintenance reference value Nhighref, the value (Nbase+Nadd) obtained through addition of the addition value Nadd to the base value Nbase. After that, the CPU 51 proceeds to Step 995 so as to end the current execution of the present routine. Thus, the High-level-maintenance reference value Nhighref, which is used for the determination in Step 845 of FIG. 8, is set to the value (Nbase+Nadd), which corresponds to the above-mentioned value (Tbase+Tadd). As a result, upon execution of the routine of FIG. 8, the High-level-maintenance time Thigh is set to the time (Tbase+Nadd) (see, for example, time t7 in FIG. 5).

After that, the CPU 51 repeatedly executes the processing in Steps 900, 905, 920, 945, and 995 until the value of the high level flag HIGH is again changed from "1" to "0" (that is, until the High-level-maintenance time Thigh elapses). When the value of the high level flag HIGH is again changed from "1" to "0" (see, for example, times t2, t4 in FIG. 5), the CPU 51 makes a "Yes" determination when it proceeds to Step 920, and again executes the above-described sequence of processing steps.

As described above, every time the value of the high level flag HIGH is changed from "0" to "1" (accordingly, every time the generated voltage VMT reaches the voltage threshold VMTTH), the High-level-maintenance time Thigh to be used in the next processing cycle is determined on the basis of the time T measured in the present processing cycle (as well as the times T measured in the previous processing cycle and the processing cycle before the previous processing cycle, respectively).

As described above, the pump drive motor control apparatus according to the first embodiment of the present invention operates as follows. So long as the predetermined pump drive-control condition is satisfied, the apparatus measures the above-mentioned time T (see FIG. 5), which represents the rate of decrease of the generated voltage VMT, every time the supply of electricity of the motor MT is resumed (every time the motor control signal Vcont is changed from the Low level to the High level). Further, the apparatus normally sets the High-level-maintenance time Thigh to the base time Tbase. When a state in which the above-mentioned time T is not longer than the reference time Tth is continuously detected the determination reference number of times Nth (3 in the present embodiment) or more, the apparatus determines that the loads imposed on the hydraulic pumps HPf and HPr are large, and sets the High-level-maintenance time Thigh to the time (Tbase+Tadd) obtained through addition of the predetermined additional time Tadd to the base time Tbase, to thereby increase the average rotational speed of the motor MT.

The above operation reliably prevents the occurrence of failure of the ABS control, which failure would otherwise occur in the case where the average rotational speeds of the hydraulic pumps HPf and HPr continuously decrease because of continuous load, and the quantity of brake fluid contained in the reservoirs RSf and RSr gradually increases, with the result that the reservoirs RSf and RSr are completely filled with the brake fluid.

Second Embodiment

Next, a pump drive motor control apparatus according to a second embodiment of the present invention will be described. This apparatus differs from the first embodiment only in that when the loads imposed on the hydraulic pumps HPf and HPr are judged to be large (i.e., when the state in which the above-mentioned time T is not longer than a predetermined reference time Tth is successively detected the determination reference number of times Nth (3 times) or more), instead of increasing the High-level-maintenance time Thigh, the apparatus increases the voltage threshold VMTTH so as to increase the average rotational speed of the motor MT. Therefore, only this difference will be described.

Outline of Rotational Speed Control for Motor MT

Like the apparatus of the first embodiment, so long as the above-mentioned pump drive-control condition is satisfied, the present apparatus measures the above-mentioned time T (see FIG. 4) every time the supply of electricity of the motor MT is resumed. Further, every time the supply of electricity of the motor MT is resumed, the present apparatus usually sets the voltage threshold VMTTH to a base voltage Vbase; and only when a state in which the above-mentioned time T is not longer than a predetermined reference time Tth is successively detected the determination reference number of times Nth (3 in the present embodiment) or more, the apparatus determines that the loads imposed on the hydraulic pumps HPf and HPr are large. In such a case, the apparatus adds an additional voltage Vadd to the above-mentioned base voltage Vbase, and the thus-calculated voltage (Vbase+Vadd) is used as the voltage threshold VMTTH in a subsequent processing cycle. The High-level-maintenance time Thigh is always set to the above-mentioned base time Tbase.

In the present embodiment, the additional voltage Vadd is set in such a manner that the smaller the latest value of the measured time T, the larger the additional voltage Vadd. This setting is performed on the basis of the knowledge that the shorter the time T (accordingly, the greater the rate of decrease of the generated voltage VMT), the heavier the loads imposed on the hydraulic pumps HPf and HPr, with the result that failure of the ABS control is likely to occur, and that in such a case, the average rotational speed of the motor MT must be increased.

Figure 10:
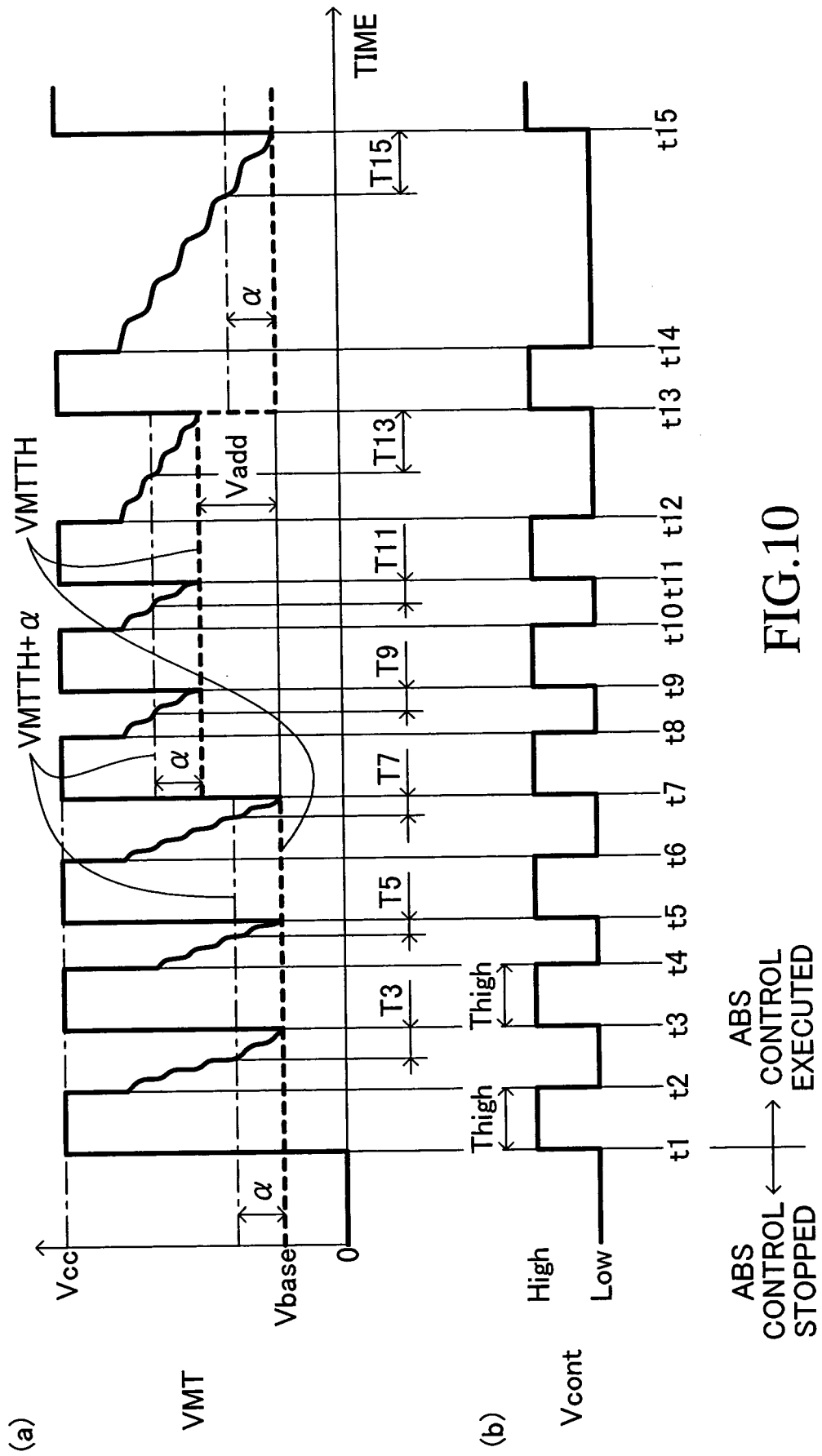
FIG. 10 is a time chart showing example changes in the motor inter-terminal voltage and motor control signal shown in FIG. 3 during execution of ABS control (during drive-control of the motor MT) by a CPU of a pump drive motor control apparatus according to a second embodiment of the present invention.

Like FIG. 5, FIG. 10 is a time chart showing example changes in the motor inter-terminal voltage VMT and the motor control signal Vcont for the case in which a certain wheel is locked in response to the driver's operation of the brake pedal BP, and ABS control is started at time t1 (accordingly, the case in which the predetermined pump drive-control condition is satisfied at and after time t1). This time chart shows an example case in which among times T3, T5, T7, T9, T11, T13, and T15 corresponding to the time T of FIG. 4, the times T3, T5, T7, T9, and T11 are shorter than the above-mentioned reference time Tth, whereas the times T13 and T15 are longer than the reference time Tth.

In this example, at times t3 and t5, at which the supply of electricity to the motor MT is resumed, the voltage threshold VMTTH is maintained at the above-mentioned base voltage Vbase. Like the example case shown in FIG. 5, in this assumed case, none of the times T3, T5, and T7 is longer than the reference time Tth; therefore, the state in which the above-mentioned time T is not longer than the predetermined reference time Tth is successively detected the determination reference number of times Nth (3 in the present embodiment) or more up to time t7. Accordingly, at time t7, the present apparatus determines that the loads imposed on the hydraulic pumps HPf and HPr are large. In such a case, the apparatus adds the additional voltage Vadd to the base voltage Vbase, and uses the thus-calculated voltage (Vbase+Vadd) as the voltage threshold VMTTH in a subsequent processing cycle. The additional voltage Vadd is set in accordance with time T7, which is the latest value of the measured time T. As a result, during a period after time t7, the voltage threshold VMTTH is maintained at the voltage (Vbase+Vadd) at least up to time t9, at which the supply of electricity to the motor MT is again resumed.

Moreover, under the above-described assumption, since time T9 and T11 before time t9 and t11, respectively, are not longer than the reference time Tth, the state in which the above-mentioned time T is not longer than the predetermined reference time Tth is successively detected the determination reference number of times Nth (3 in the present embodiment) or more up to each of time t9 and t11. Accordingly, at each of times t9 and t11, the present apparatus adds the additional voltage Vadd to the base voltage Vbase, and uses the thus-calculated voltage (Vbase+Vadd) as the voltage threshold VMTTH in a subsequent processing cycle. That is, during the period from t7 to t13, the voltage threshold VMTTH is maintained at the voltage (Vbase+Vadd). Thus, the average rotational speed of the motor MT is increased.

In this assumed case, the measured time T13 (T15) before time t13 (time t15), at which the supply of electricity to the motor MT is resumed, is longer than the reference time Tth. Accordingly, the present apparatus determines that the hydraulic pumps HPf and HPr have exited the state in which the loads are large, and again sets the voltage threshold VMTTH to the base voltage Vbase after time t13.

As described above, the present apparatus normally sets the voltage threshold VMTTH to the base voltage Vbase; and only when all the rates of decrease of the generated voltage VMT represented by a plurality (three in the present embodiment) of times T (see FIG. 4) continuously obtained are equal to or greater than a predetermined value, the present apparatus adds the additional voltage Vadd to the base voltage Vbase, and uses the thus-calculated voltage (Vbase+Vadd) as the voltage threshold VMTTH. The above is the outline of the rotational speed control for the motor MT.

Actual Operation

The actual operation of the pump drive motor control apparatus according to the second embodiment of the present invention will be explained. The CPU 51 of the present apparatus executes the routines shown in FIGS. 6 to 8, as they are, among the routines shown in FIGS. 6 to 9 executed by the CPU 51 of the first embodiment, and executes a routine shown in FIG. 11 in place of the routine shown in FIG. 9. Only the routine shown in FIG. 11, peculiar to the second embodiment, will now be described.

Figure 8:
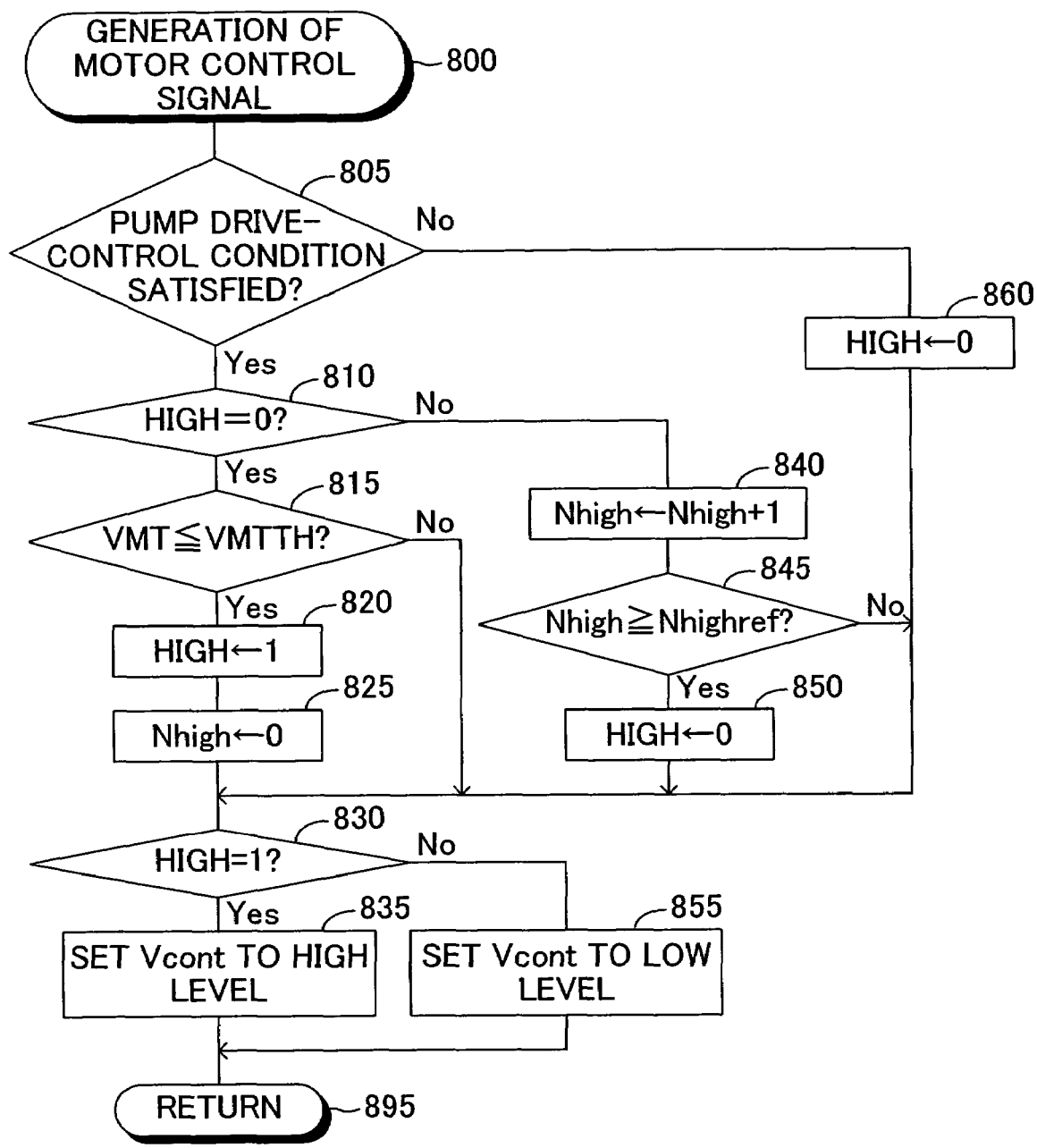
FIG. 8 is a flowchart showing a routine which the CPU shown in FIG. 1 executes in order to generate a motor control signal.
Figure 11:
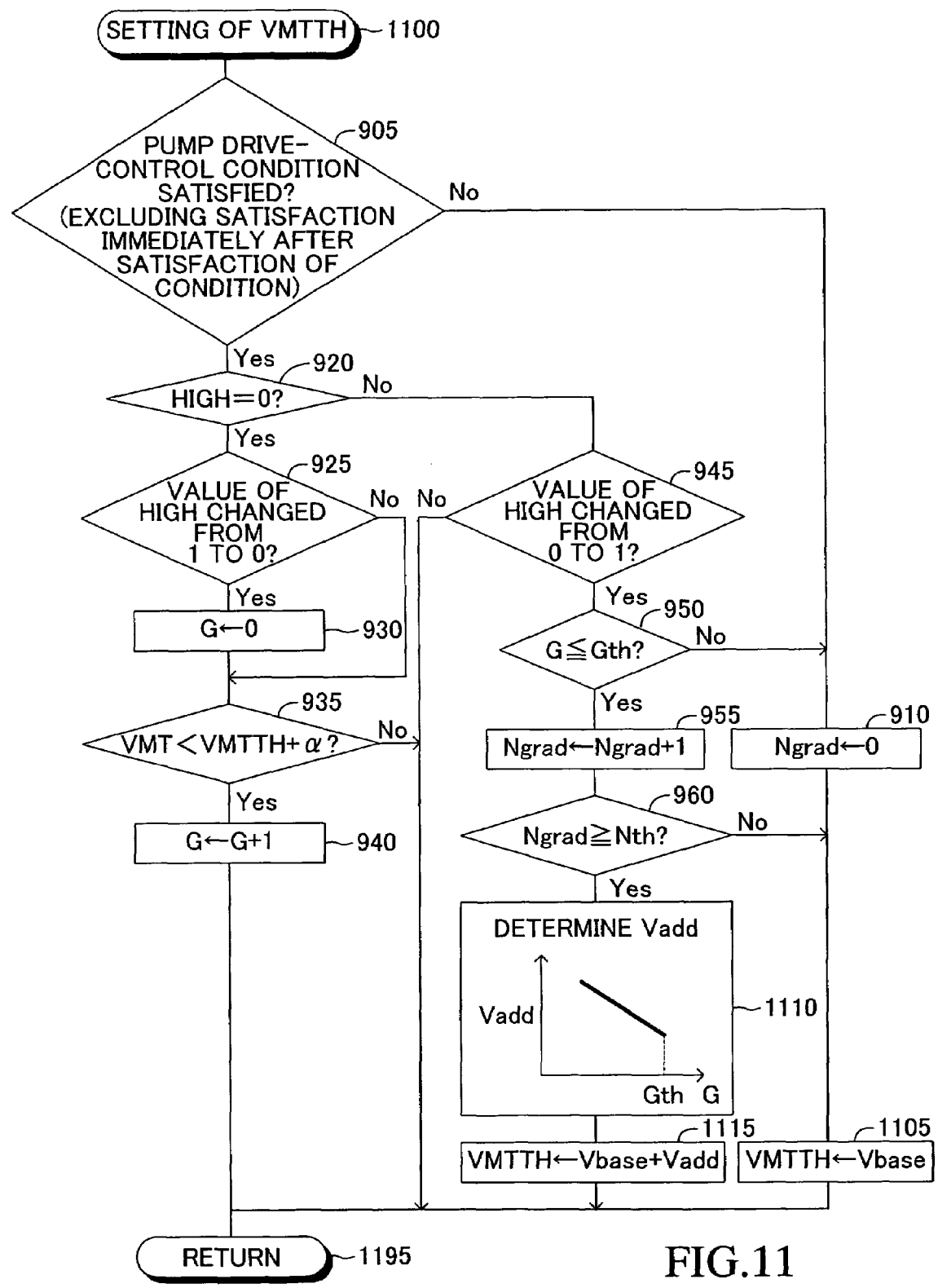
FIG. 11 is a flowchart showing a routine which the CPU of the pump drive motor control apparatus according to the second embodiment executes in order to set a voltage threshold.

The CPU 51 repeatedly executes the routine of FIG. 11 for setting the voltage threshold VMTTH (the value used in Step 815 of FIG. 8). The routine of FIG. 11 resembles the previously described routine of FIG. 9, and those steps which are identical with those of FIG. 9 are denoted by the same step numbers.

Figure 9:
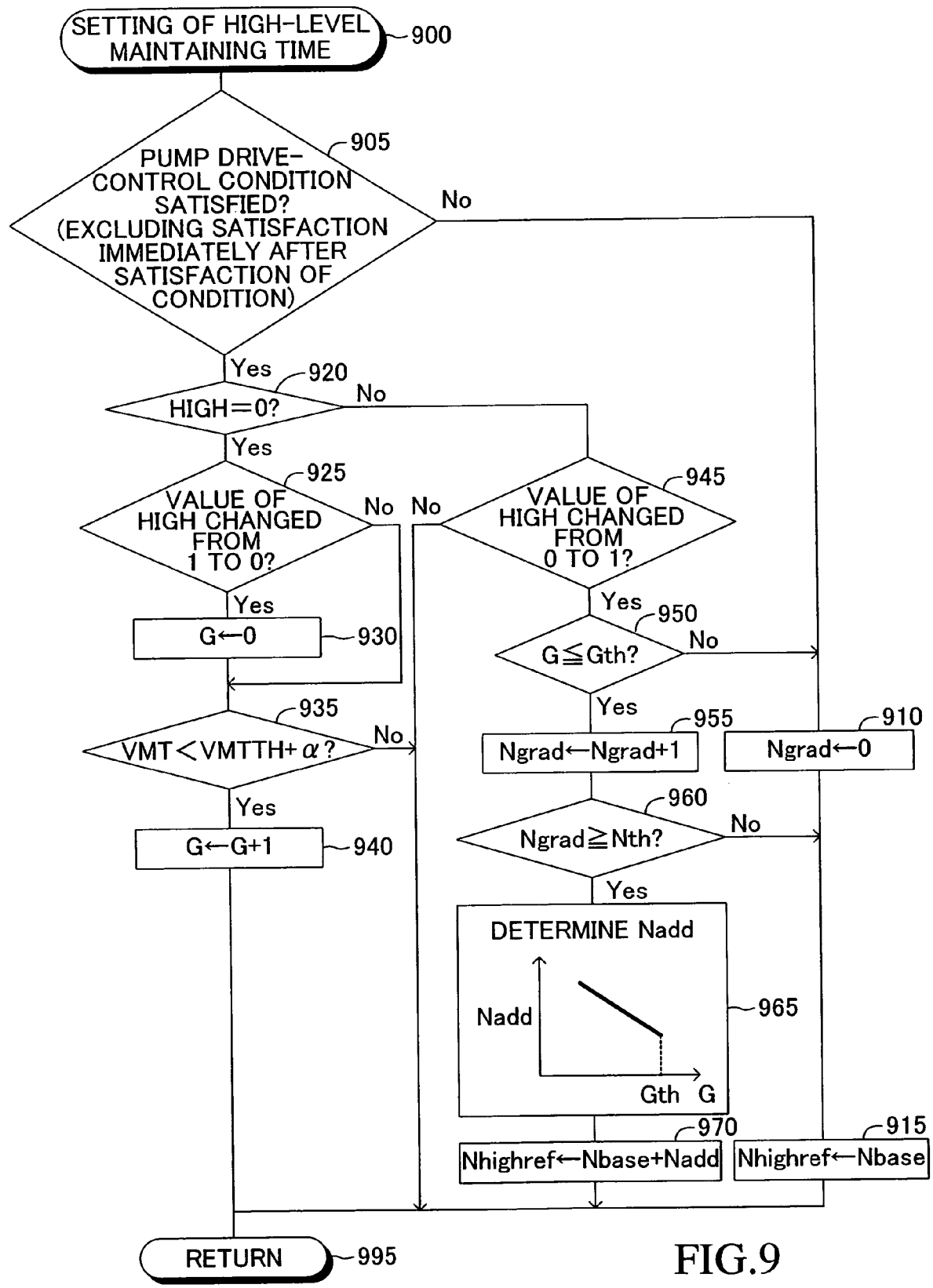
FIG. 9 is a flowchart showing a routine which the CPU shown in FIG. 1 executes in order to set a High-level maintenance time.

Steps 1105, 1110, and 1115 of FIG. 11 correspond to Steps 915, 965, and 970 of FIG. 9, respectively. Upon execution of the routine of FIG. 11, every time the generated voltage VMT reaches the voltage threshold VMTTH and the value of the high level flag HIGH is changed from "0" to "1" (i.e., every time a "Yes" determination is made in Step 945), the voltage threshold VMTTH is determined and updated on the basis of the time T measured in the present processing cycle (as well as the times T measured in the previous processing cycle and the processing cycle before the previous processing cycle, respectively).

The present invention is not limited to the above-described embodiments, and may be modified in various manners within the scope of the present invention. For example, the following modifications may be employed. In the above-described embodiments, the pump drive motor control apparatus employs, as the voltage-decreasing-speed index value, the time T, which the above-mentioned generated voltage VMT, which decreases with time, requires to reach the voltage threshold VMTTH (the second voltage at which the supply of electricity to the motor MT is resumed) after having reached the voltage (the first voltage) (VMTTH+$\alpha$) which is higher than the voltage threshold VMTTH by the predetermined amount $\alpha$. However, the pump drive motor control apparatus may employ, as the voltage-decreasing-speed index value, the amount of change in the generated voltage VMT during a predetermined period within the period in which electricity is not supplied to the motor MT (within the period between a point in time at which the supply of electricity is stopped and a point in time at which the supply of electricity is resumed).

The pump drive motor control apparatus is configured in such a manner that when the loads imposed on the hydraulic pumps HPf and HPr are determined to be large (that is, when the state in which the above-mentioned time T is not longer than the above-mentioned reference time Tth is successively detected the determination reference number of times Nth (3 times) or more), the High-level-maintenance time Thigh is increased (the voltage threshold VMTTH is always fixed) (in the first embodiment), or the voltage threshold VMTTH is increased (the High-level-maintenance time Thigh is always fixed) (in the second embodiment). However, the pump drive motor control apparatus may be configured in such a manner that when the loads of the hydraulic pumps HPf and HPr are determined to be large, both the High-level-maintenance time Thigh and the voltage threshold VMTTH are increased.

What is claimed is:

1. A pump drive motor control apparatus for controlling a motor for driving a pump, comprising:

control means for controlling rotational speed of the motor through on-off control performed such that supply of electricity to the motor is resumed on the basis of a result of comparison between a predetermined threshold and a voltage which the motor generates in a state in which supply of electricity to the motor is stopped and such that the supply of electricity is stopped after the supply of electricity is continued for a predetermined period of time;

decreasing-speed-index obtaining means for obtaining a voltage-decreasing-speed index value indicative of a rate of decrease of the voltage which the motor generates in the state in which the electricity supply is stopped; and average-rotational-speed changing means for changing a parameter which affects an average rotational speed of the motor in accordance with a rate of decrease of the voltage represented by the obtained voltage-decreasing-speed index value, wherein the decreasing-speed-index obtaining means obtains, as the voltage-decreasing-speed index value, a time which, after having reached a first voltage greater than the predetermined threshold, the voltage requires to reach a second voltage which is greater than the predetermined threshold but lower than the first voltage.

2. A pump drive motor control apparatus according to claim 1, wherein the pump driven by the motor is a hydraulic pump used in a brake fluid pressure controller of a vehicle including at least an antilock brake system, the hydraulic pump pumping brake fluid discharged to a reservoir as a result of operation of the brake fluid pressure controller and supplying the pumped brake fluid to a hydraulic circuit of the brake fluid pressure controller, and wherein the control means controls the rotational speed of the motor at least during a period in which the brake fluid pressure controller is operating.

3. A pump drive motor control apparatus according to claim 1, wherein the decreasing-speed-index obtaining means is configured to obtain the voltage-decreasing-speed index value every time the supply of electricity is stopped, and wherein the average-rotational-speed changing means is configured to change the parameter on the basis of a plurality of the voltage-decreasing-speed index values successively obtained by means of the decreasing-speed-index obtaining means.

4. A pump drive motor control apparatus according to claim 1, wherein the average-rotational-speed changing means is configured to change, as the parameter, the predetermined period of time during which the supply of electricity is continued.

5. A pump drive motor control apparatus according to claim 1, wherein the average-rotational-speed changing means is configured to change, as the parameter, the predetermined threshold.

6. A pump drive motor control apparatus according to claim 1, wherein the control means is configured to resume the supply of electricity to the motor when the voltage which the motor generates in a state in which the supply of electricity to the motor is stopped becomes equal to or less than the threshold.

7. A pump drive motor control apparatus according to claim 1, wherein the average-rotational-speed changing means is configured to increase the average rotational speed of the motor by changing the parameter when the rate of decrease of the voltage represented by the obtained voltage-decreasing-speed index value becomes equal to or greater than a predetermined value.

8. A pump drive motor control apparatus according to claim 2, wherein the control means is configured to start the rotational speed control for the motor simultaneously with the start of operation of the brake fluid pressure controller.

9. A pump drive motor control apparatus according to claim 3, wherein the average-rotational-speed changing means is configured to increase the average rotational speed of the motor by changing the parameter when all of voltage decreasing rates represented by the plurality of voltage-decreasing-speed index values successively obtained become equal to or greater than a predetermined value.

* * * * *